April 30, 1940.       H. B. WOMACK       2,199,299
SHEAR TOOTH CLIPPER BLADE
Filed June 30, 1939
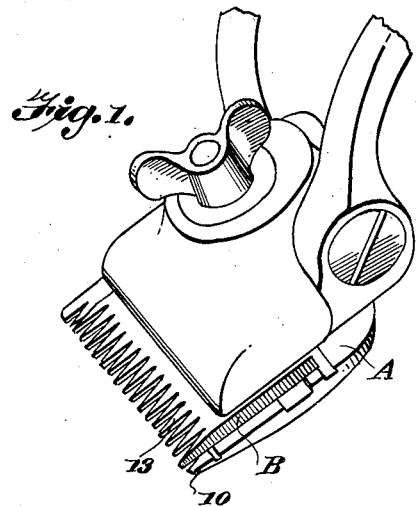
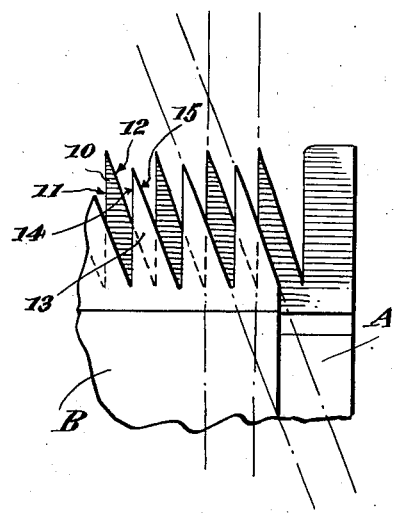
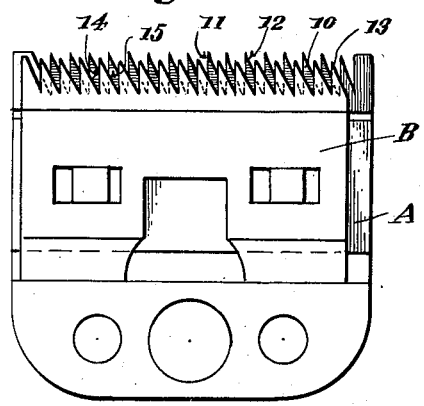
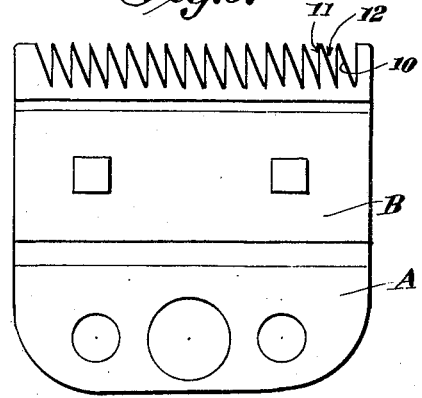
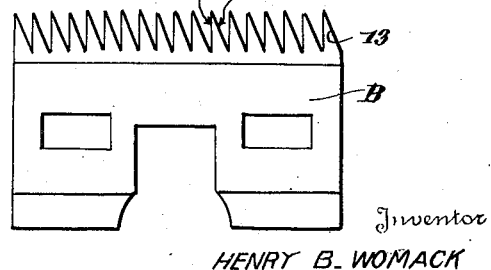
Inventor
HENRY B. WOMACK Patented Apr. 30, 1940

2,199,299

UNITED STATES PATENT OFFICE 2,199,299

SHEAR TOOTH CLIPPER BLADE

Henry B. Womack, Birmingham, Ala.

Application June 30, 1939, Serial No. 282,234

3 Claims. (Cl. 30—225)

This invention relates to clippers and has for one of its objects the production of a toothed formation for the guard as well as the cutting blade of clippers and the like, specially designed to produce a shearing action for facilitating the cutting of hair, wool and the like, whether the tool is used by barbers, or for shearing animals.

A further object of this invention is the production of a simple and efficient toothed arrangement for clippers, wherein each tooth of the guard is provided with one straight and one inclined side cutting edge and each tooth of the cutting blade is provided with similar cutting edges in a manner whereby the inclined cutting edges of the cutting blade teeth, by moving across the straight edges of the guard teeth and vice versa, will produce an efficient shearing action.

Other objects and advantages of the present invention will appear throughout the following specification and claims.

In the drawing:

Figure 1 is a perspective view of the head of a clipper, showing the improved cutting teeth;

Figure 2 is a top plan view of the base of the clipper and cutting blade carried thereby, the upper portion of the clipper being removed;

Figure 3 is a plan view of the guard;

Figure 4 is a plan view of the cutting blade;

Figure 5 is an enlarged fragmentary top plan view of the blade and guard, showing the relative arrangement of the guard teeth and cutting blade teeth.

By referring to the drawing, it will be seen that A designates the conventional type of clipper. In connection with this clipper, however, I provide a specially devised type of guard teeth 10 which extend forwardly of the clipper. Each tooth 10 is provided with a straight cutting edge 11 which extends at approximately right angles to the longitudinal axis of the row of teeth, and each tooth 10 is also provided with an inclined cutting edge 12, which inclined cutting edge 12 extends at an angle of approximately thirty degrees to the longitudinal axis of the row of teeth.

A conventional cutting blade B is mounted in the conventional manner upon the guard of the clipper A and is actuated in the conventional manner also. The cutting blade B, however, is provided with specially designed cutting teeth 13 which are constructed similarly to the teeth 10. Each tooth 13 is provided with a straight cutting edge 14 extending at right angles to the longitudinal axis of the row of teeth and an inclined cutting edge 15 extends at an angle of approximately thirty degrees to the longitudinal axis of the row of teeth. The teeth 13 are adapted to reciprocate across the guard teeth 10, first toward the right, and then in a return direction toward the left. By noting particularly Figure 5, it will be observed that as the cutting blade B is moved toward the right across the guard so as to move the teeth 13 toward the right across the teeth 10, the inclined cutting edges 15 of the teeth 13 will cut across or against the straight cutting edges 11 of the guard teeth 10. While the teeth 10 13 move across and off the teeth 10, these teeth 13 will be taking hold of the hair or material being cut adjacent the adjoining teeth, thereby making a continuous cut and providing a shearing action without jumping across the adjoining teeth as is usual with the conventional type of clipper. Upon the return action of the blade B, the straight edge 14 of the teeth 13 will shear against or across the inclined edges 13 of the teeth 10. Consequently, a shearing action will be produced at both the right and left directional movements of the teeth 13 across the teeth 10, thereby producing an efficient shearing action, such for instance as is produced by scissors teeth or blades.

It has been found by actual experience, that the standard clipper teeth of a clipper blade have a tendency as the blade gets thinner or worn, to drop slightly between the teeth of the guard which will slightly round the edges of the teeth, thereby causing the teeth to become dull. By means of the shearing action produced by the structure shown in detail in Figure 5, the edges of the teeth will tend to remain sharpened and will remain sharp for a maximum length of time.

It should be understood that the present structure is adapted for clippers such as are now employed for barber use in cutting hair, or the same structural arrangement may be provided in producing animal shears for shearing wool and the like.

Certain detail changes in the mechanical construction may be employed without departing from the spirit of the invention, so long as such changes fall within the scope of the appended claims.

Having described the invention, what I claim is:

1. A clipper having a guard, the guard having teeth formed upon the forward edge thereof, each tooth of the guard having one straight and one inclined cutting edge, a cutting blade having forwardly extending teeth overlapping the teeth of the guard, each tooth of the cutting blade having one straight and one inclined cutting edge, the straight edges of the teeth of the guard and the straight edges of the teeth of the cutting blade being substantially parallel and in the same side of the tooth, the inclined cutting edges of the teeth of the cutting blade and the inclined edges of the teeth of the guard being substantially parallel and on the same side of the tooth, and the teeth of the cutting blade being movable transversely of the teeth of the guard to provide a shearing action between the inclined cutting edges of the teeth of the cutting blade and the straight edges of the teeth of the guard when the cutting blade is moved in one direction and a shearing action between the inclined edges of the teeth of the guard and the straight edges of the teeth of the cutting blade when the cutting blade is moved in the opposite direction.

2. A clipper having a guard, the guard having teeth, each tooth of the guard having one straight edge and one inclined edge arranged in uniform relation, a cutting blade having teeth, each tooth of the cutting blade being provided with one straight edge and one inclined edge arranged in uniform relation, the teeth of the cutting blade overlapping the teeth of the guard, the inclined and straight edges of the teeth of the cutting blade corresponding with the inclined and straight edges of the teeth of the guard in a manner whereby the inclined edges of the teeth of the cutting blade will produce a shearing action in conjunction with the straight edges of the teeth of the guard as the cutting blade is moved upon the guard in one direction and the straight edges of the cutting teeth will provide a shearing action in conjunction with the inclined edges of the teeth of the guard when the cutting blade is moved in the opposite direction, thereby causing the cutting to always occur between the straight and inclined edges of the teeth of the guard and cutting blade.

3. A clipper having a guard, the guard having teeth, each tooth of the guard having one straight edge and one inclined edge arranged in uniform relation, a cutting blade having teeth, each tooth of the cutting blade being provided with one straight edge and one inclined edge arranged in uniform relation, the teeth of the cutting blade overlapping the teeth of the guard, the inclined and straight edges of the teeth of the cutting blade corresponding with the inclined and straight edges of the teeth of the guard in a manner whereby the inclined edges of the teeth of the cutting blade will produce a shearing action in conjunction with the straight edges of the teeth of the guard as the cutting blade is moved upon the guard in one direction and the straight edges of the cutting teeth will provide a shearing action in conjunction with the inclined edges of the teeth of the guard when the cutting blade is moved in the opposite direction, thereby causing the cutting to always occur between the straight and inclined edges of the teeth of the guard and cutting blade, the cutting blade being movable for a distance equivalent to the width of a plurality of teeth whereby the teeth of the cutting blade while moving the distance equivalent to the width of a tooth of the guard will begin a shearing action across an adjoining tooth of the guard and vice versa upon the return stroke.

HENRY B. WOMACK.